US011250204B2

(12) United States Patent
Ganhotra et al.

(10) Patent No.: US 11,250,204 B2
(45) Date of Patent: Feb. 15, 2022

(54) CONTEXT-AWARE KNOWLEDGE BASE SYSTEM

(71) Applicant: INTERNATIONAL BUSINESS MACHINES CORPORATION, Armonk, NY (US)

(72) Inventors: Jatin Ganhotra, White Plains, NY (US); Cheng Wu, Bellevue, WA (US)

(73) Assignee: International Business Machines Corporation, Armonk, NY (US)

(*) Notice: Subject to any disclaimer, the term of this patent is extended or adjusted under 35 U.S.C. 154(b) by 1073 days.

(21) Appl. No.: 15/831,412

(22) Filed: Dec. 5, 2017

(65) Prior Publication Data
US 2019/0171945 A1    Jun. 6, 2019

(51) Int. Cl.
*G06F 40/14* (2020.01)
*G06N 5/02* (2006.01)
*G06F 40/143* (2020.01)
*G06F 16/951* (2019.01)

(52) U.S. Cl.
CPC .......... *G06F 40/143* (2020.01); *G06F 16/951* (2019.01); *G06N 5/022* (2013.01)

(58) Field of Classification Search
CPC ..... G06F 40/143; G06F 16/951; G06N 5/022; G06N 3/006
See application file for complete search history.

(56) References Cited

U.S. PATENT DOCUMENTS

| 8,037,083 | B2  | 10/2011 | Meyer et al. |
| 8,255,793 | B2* | 8/2012  | Chakrabarti ......... G06F 40/131 715/234 |
| 8,606,778 | B1  | 12/2013 | Harik et al. |

(Continued)

FOREIGN PATENT DOCUMENTS

CN    1766871 A    5/2006

OTHER PUBLICATIONS

Coetzee et al., "SparqPlug: Generating Linked Data from Legacy HTML, Sparql and the DOM," Copyright is held by the author/owner(s), LDOW2008, Linking Enterprise Data, WWW 2008 Workshop: Linked Data on the Web—Apr. 22, 2008—Beijing, China, pp. 1-10.

(Continued)

*Primary Examiner* — Mahelet Shiberou
(74) *Attorney, Agent, or Firm* — Steven M. Bouknight

(57) ABSTRACT

A method for generating a context-aware knowledge base is provided. The method may include extracting document object model (DOM) tag elements associated with one or more webpages. The method may further include identifying and extracting webpage data associated with the extracted DOM tags. The method may further include determining a context associated with the identified and extracted webpage data by detecting and extracting resource description framework (RDF) triplets in candidate DOM tag elements. The method may further include ranking the extracted RDF triplets. The method may also include validating one or more RDF triplets associated with the ranked RDF triplets. The method may further include connecting the validated RDF triplets to a knowledge graph associated with a knowledge base of the one or more webpages.

17 Claims, 7 Drawing Sheets

(56) References Cited

U.S. PATENT DOCUMENTS

| | | | |
|---|---|---|---|
| 8,819,028 B2* | 8/2014 | Luo | G06F 16/986 707/748 |
| 9,558,265 B1* | 1/2017 | Tacchi | G06N 5/022 |
| 9,710,544 B1* | 7/2017 | Smith | G06F 40/30 |
| 2004/0111400 A1 | 6/2004 | Chevalier | |
| 2013/0055068 A1* | 2/2013 | Mahmud | G06F 16/986 715/234 |
| 2014/0095463 A1* | 4/2014 | Pappas | G06F 16/951 707/706 |
| 2016/0188564 A1* | 6/2016 | Lobez Comeras | G06F 16/367 704/9 |
| 2016/0224637 A1 | 8/2016 | Sukumar et al. | |
| 2016/0275177 A1* | 9/2016 | Yin | G06F 16/951 |
| 2016/0275180 A1* | 9/2016 | Matskevich | G06F 16/3344 |

OTHER PUBLICATIONS

Galkin et al., Identifying Web Tables—Supporting a Neglected Type of Content on the Web, arXiv:1503.06598v1 [cs.IR], Mar. 23, 2015, https://arxiv.org/pdf/1503.06598.pdf, pp. 1-9.

Google, "The Knowledge Graph," Knowledge—Inside Search—Google, https://www.google.com/intl/bn/insidesearch/features/search/knowledge.html,, Printed on Jun. 26, 2017, pp. 1-3.

He et al., "Scalable and noise tolerant web knowledge extraction for search task simplification," Decision Support Systems, vol. 56, Dec. 2013, © 2017 Elsevier B.V. or its licensors or contributors, pp. 156-167.

Li et al., "Question Identification on Twitter," CIKM '11, Oct. 24-28, 2011, Glasgow, Scotland, UK, Copyright 2011 ACM, pp. 1-4.

Michelucci, "Handbook of Human Computation," FOREWORD, Springer New York Heidelberg Dordrecht London, Copyright Springer Science+Business Media New York 2013 (Best Date Available), Edition No. 1, https://rd.springer.com/book/10.1007/978-1-4614-8806-4, pp. 1-39.

Roengsamut et al., "Toward gamification of knowledge base construction," International Symposium on Innovations in Intelligent Systems and Applications (INISTA), Sep. 2-4, 2015, Madrid, Spain, Published by IEEE, Date added to IEEE Xplore: Sep. 28, 2015, pp. 1-3.

Rusu et al., Triplet Extraction From Sentences, Proceedings of the 10th International Multiconference Information Society—IS, 2007 (Best Date Available), http://ailab.ijs.si/dunja/SiKDD2007/Papers/Rusu_Trippels.pdf, pp. 1-5.

Singh et al., "Transformation rules for decomposing heterogeneous data into triplets," Journal of King Saud University—Computer and Information Sciences (2015), vol. 27, Available online Mar. 26, 2015, pp. 181-192.

Tekli et al., "Building Semantic Trees from XML Documents," Journal of Web Semantics: Science, Services and Agents on the World Wide Web, vols. 37-38, Mar. 2016, http://www.sciencedirect.com/science/article/pii/S1570826816000202, pp. 1-27.

Wikipedia, "DBpedia" https://en.wikipedia.org/wiki/DBpedia, Printed on Jun. 26, 2017, pp. 1-5.

Wikipedia, "Knowledge Graph," https://en.wikipedia.org/wiki/Knowledge_Graph, Printed on Jun. 26, 2017, pp. 1-4.

Wikipedia, "Question Answering," https://en.wikipedia.org/wiki/Question_answering, Printed on Jun. 26, 2017, pp. 1-7.

Wikipedia, "The World Factbook," https://en.wikipedia.org/wiki/The_World_Factbook, Printed on Jun. 26, 2017, pp. 1-12.

Wikipedia, "Wikidata," https://en.wikipedia.org/wiki/Wikidata, Printed on Jun. 26, 2017, pp. 1-5.

Wikipedia, "Wikipedia," https://en.wikipedia.org/wiki/Wikipedia, Printed on Jun. 26, 2017, pp. 1-45.

Wikipedia, "Wolfram Alpha," https://en.wikipedia.org/wiki/Wolfram_Alpha, Printed on Jun. 26, 2017, pp. 1-6.

Zhai et al., "Web Data Extraction Based on Partial Tree Alignment," Proceedings of the 14th International Conference on World Wide Web, May 10-14, 2005, Chiba, Japan, Copyright ACM 2005, pp. 1-10.

Mell et al., "The NIST Definition of Cloud Computing," National Institute of Standards and Technology, U.S. Department of Commerce, Special Publication 800-145, Sep. 2011, pp. 1-7.

* cited by examiner

CONTEXT-AWARE KNOWLEDGE BASE SYSTEM

BACKGROUND

The present invention relates generally to the field of computing, and more specifically, to data processing and management.

Generally, a knowledge base may be a centralized repository for information. Typically, the knowledge base may be used to store complex structured and unstructured information that is used by a computer system. For example, for online information associated with a business, the knowledge base may be a part of a knowledge-based system that consists of the knowledge base, which may include an online library of information about a product, service, department, or topic associated with the business. The data in a knowledge base can be derived from different sources and include several contributors that are well versed on a given subject. For businesses, subjects may range from information associated a human resources or legal department, or information on a new product or service.

SUMMARY

A method for generating a context-aware knowledge base is provided. The method may include extracting document object model (DOM) tag elements associated with one or more webpages. The method may further include identifying and extracting webpage data associated with the extracted DOM tags. The method may further include determining a context associated with the identified and extracted webpage data by detecting and extracting resource description framework (RDF) triplets in candidate DOM tag elements. The method may further include ranking the extracted RDF triplets. The method may also include validating one or more RDF triplets associated with the ranked RDF triplets. The method may further include connecting the validated RDF triplets to a knowledge graph associated with a knowledge base of the one or more webpages.

A computer system for generating a context-aware knowledge base is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include extracting document object model (DOM) tag elements associated with one or more webpages. The method may further include identifying and extracting webpage data associated with the extracted DOM tags. The method may further include determining a context associated with the identified and extracted webpage data by detecting and extracting resource description framework (RDF) triplets in candidate DOM tag elements. The method may further include ranking the extracted RDF triplets. The method may also include validating one or more RDF triplets associated with the ranked RDF triplets. The method may further include connecting the validated RDF triplets to a knowledge graph associated with a knowledge base of the one or more webpages.

A computer program product for generating a context-aware knowledge base is provided. The computer program product may include one or more computer-readable storage devices and program instructions stored on at least one of the one or more tangible storage devices, the program instructions executable by a processor. The computer program product may include program instructions to extract document object model (DOM) tag elements associated with one or more webpages. The computer program product may further include program instructions to identify and extract webpage data associated with the extracted DOM tags. The computer program product may also include program instructions to determine a context associated with the identified and extracted webpage data by detecting and extracting resource description framework (RDF) triplets in candidate DOM tag elements. The computer program product may further include program instructions to rank the extracted RDF triplets. The computer program product may also include program instructions to validate one or more RDF triplets associated with the ranked RDF triplets. The computer program product may further include program instructions to connect the validated RDF triplets to a knowledge graph associated with a knowledge base of the one or more webpages.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
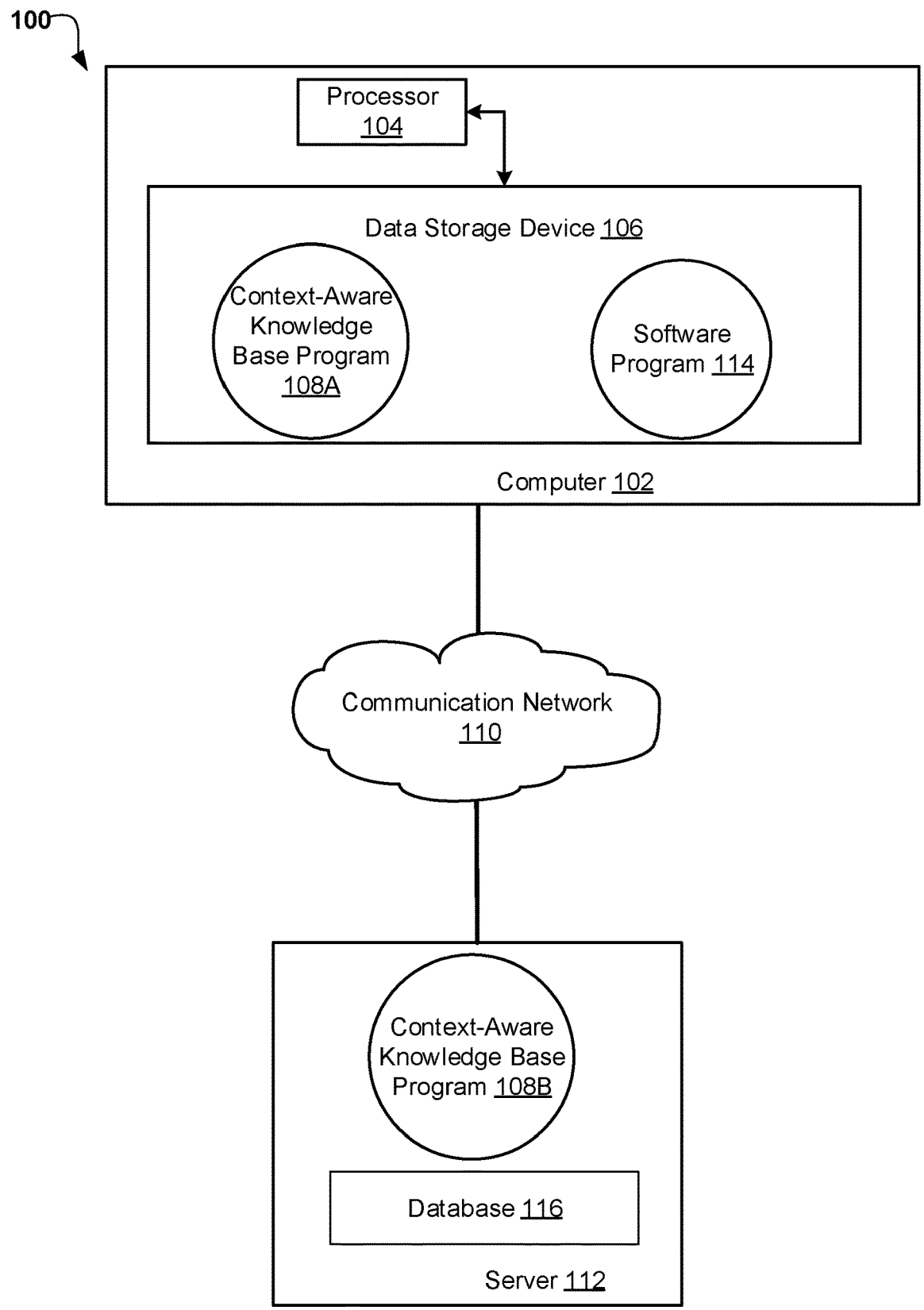
FIG. 1 illustrates a networked computer environment according to one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention relate generally to the field of computing, and more particularly, to data processing and management. The following described exemplary embodiments provide a system, method and program product for generating a context-aware knowledge base. Specifically, the present embodiment has the capacity to improve the technical field associated with knowledge bases question answering systems and increase the efficiency of question and answering systems by creating a knowledge base for webpages using the information provided on webpages as the data source mainly using automated methods and minimal manual work, whereby the knowledge base created can be used for building dialog-based virtual assistants (aka chat-bots) without having to manually design the dialog conversation flow. Furthermore, the chat-bot may be optimized using the knowledge base whereby if there are updates on the webpage, changes in the chat-bot do not have to be manually updated as the knowledge base may automatically update. More specifically, the system, method and program product may create an automated context-aware knowledge base by using syntax-based context-aware extraction of webpage data, semantic-based refinement of the extracted webpage data, and automated optimization of the syntax-based context-aware extraction and semantic-based refinement.

As previously described with respect to data processing and management, a knowledge base may be used to store complex structured and unstructured information that is used by a computer system. For example, for businesses, the knowledge base may include an online library of information about a product, service, department, or topic associated with the business. Data in a knowledge base can be derived from different sources and include several contributors that are well versed on a given subject, and for business, data subjects may range from information associated with a human resources or legal department, or information on a new product or service. However, manually constructing a knowledge base can be a time consuming and inaccurate process. For example, businesses may use semantic web knowledge base graphs as the backend data source for websites to enhance a search engine optimization (SEO) score, but building the web knowledge base graph manually requires a lot of time and effort. Similar drawbacks associated with current techniques for building a knowledge base may include: current techniques work only on very specific datasets (e.g. web tables, detail pages etc.); current techniques can be inaccurate on generic web data typically found on the web; and current techniques typically achieve accuracy only on specific use-cases (such as on well-structured data). As such, it may be advantageous, among other things, to provide a system, method and program product for creating an automated context-aware knowledge by generating a context-aware knowledge base. Specifically, the system, method, and program product may generate a context-aware knowledge base by using syntax-based context-aware extraction of webpage data, semantic-based refinement on the extracted webpage data, and automated optimization of the syntax-based context-aware extraction and semantic-based refinement.

According to at least one implementation of the present embodiment, webpage data associated with a webpage may be extracted using syntax-based content-aware extraction. Specifically, extracting webpage data using syntax-based content-aware extraction may include: extracting document object model (DOM) tags associated with the webpage; identifying the webpage data associated with the extracted DOM tags; determining a context associated with the identified webpage data by detecting candidate DOM tags that include resource description framework (RDF) triplets; and extracting the RDF triplets from the candidate DOM tags.

Furthermore, according to at least one implementation, semantic-based refinement may be performed on the extracted RDF triplets. Specifically, performing semantic-based refinement on the extracted RDF triplets may include: ranking the extracted RDF triplets; validating the ranked RDF triplets; connecting the validated RDF triplets to a knowledge graph associated with a context-aware knowledge base of the one or more webpages.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for generating a context-aware knowledge base.

According to at least one implementation of the present embodiment, webpage data associated with a webpage may be extracted using syntax-based content-aware extraction. Specifically, extracting webpage data using syntax-based content-aware extraction may include: extracting DOM tags associated with the webpage; identifying the webpage data associated with the extracted DOM tags; determining a context associated with the identified webpage data by detecting candidate DOM tags that include RDF triplets; and extracting the RDF triplets from the candidate DOM tags.

Furthermore, according to at least one implementation, semantic-based refinement may be performed on the extracted RDF triplets. Specifically, performing semantic-based refinement on the extracted RDF triplets may include: ranking the extracted RDF triplets; validating the ranked; connecting the validated RDF triplets to a knowledge graph associated with a context-aware knowledge base of the one or more webpages.

Referring now to FIG. 1, an exemplary networked computer environment 100 in accordance with one embodiment is depicted. The networked computer environment 100 may include a computer 102 with a processor 104 and a data storage device 106 that is enabled to run a context-aware knowledge base program 108A and a software program 114, and may also include a microphone (not shown). The software program 114 may be an application program such as an internet browser and a question answering application. The context-aware knowledge base program 108A may communicate with the software program 114. The networked computer environment 100 may also include a server 112 that is enabled to run a context-aware knowledge base program 108B and the communication network 110. The networked computer environment 100 may include a plurality of computers 102 and servers 112, only one of which is shown for illustrative brevity.

According to at least one implementation, the present embodiment may also include a database 116, which may be running on server 112. The communication network 110 may include various types of communication networks, such as a wide area network (WAN), local area network (LAN), a telecommunication network, a wireless network, a public switched network and/or a satellite network. It may be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with server computer 112 via the communications network 110. The communications network 110 may include connections, such as wire, wireless communication links, or fiber optic cables. As will be discussed with reference to FIG. 3, server computer 112 may include internal components 800a and external components 900a, respectively, and client computer 102 may include internal components 800b and external components 900b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing device capable of running a program and accessing a network. According to various implementations of the present embodiment, the context-aware knowledge base program 108A, 108B may interact with a database 116 that may be embedded in various storage devices, such as, but not limited to, a mobile device 102, a networked server 112, or a cloud storage service.

According to the present embodiment, a program, such as a context-aware knowledge base program 108A and 108B may run on the client computer 102 or on the server computer 112 via a communications network 110. The context-aware knowledge base program 108A, 108B may provide a context-aware knowledge base system for creating an automated context-aware knowledge base. Specifically, a user using a computer, such as computer 102, may run a context-aware knowledge base program 108A, 108B, that may interact with a database 116 and a software program 114, to create an automated context-aware knowledge base by using syntax-based context-aware extraction of webpage data, semantic-based refinement on the extracted webpage data, and automated optimization of the syntax-based context-aware extraction and semantic-based refinement.

Figure 2A:
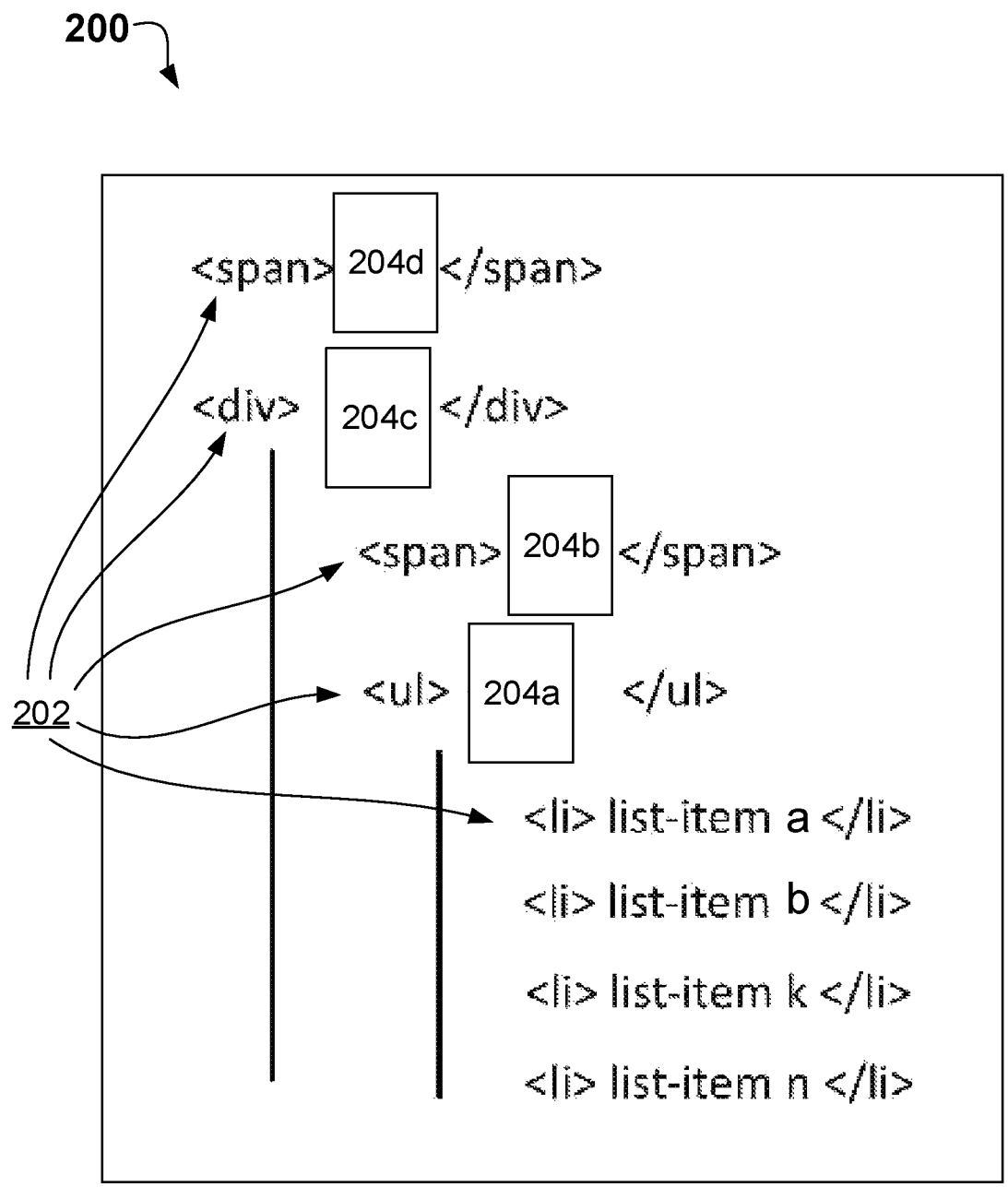
FIG. 2A is a block diagram illustrating a first example of extracted webpage data that may include hypertext markup language (HTML) code with DOM tag elements according to one embodiment.

Referring now to FIG. 2A, a block diagram 200 illustrating a first example of extracted webpage data that may include hypertext markup language (HTML) code with DOM tag elements 202 according to one embodiment is depicted. Specifically, according to one embodiment, the context-aware knowledge base program 108A, 108B (FIG. 1) may extract webpage data using syntax-based content-aware extraction by first extracting DOM tag elements associated with the webpage. For example, a webpage may include a business webpage. The context-aware knowledge base program 108A, 108B (FIG. 1) may extract the DOM tags 202 associated with the business webpage, such as extracting the DOM tag elements: <span>, <div>, <span>, <ul>, and <li>. Furthermore, the context-aware knowledge base program 108A, 108B (FIG. 1) may detect a relationship between the DOM tag elements. For example, the context-aware knowledge base program 108A, 108B (FIG. 1) may detect that the DOM tag element <ul> has a parent relationship to the DOM tag element <li>, whereby the parent relationship indicates the DOM tag element <ul> includes the DOM tag element <li>. Also for example, the context-aware knowledge base program 108A, 108B (FIG. 1) may detect that the DOM tag element <div> has a parent relationship to the DOM tag elements <ul> and <span> (located below <div>), and that the DOM tag elements <span> and <ul> are sibling DOM tag elements, whereby the parent relationship indicates that the DOM tag element <div> includes the DOM tag elements <span> and <ul>, and whereby the sibling relationship indicates that the DOM tag element <span> and <ul> are both included under the DOM tag element <div>. Thereafter, the context-aware knowledge base program 108A, 108B (FIG. 1) may extract webpage data 204a, 204b, 204c, 204d associated with the extracted DOM tags 202.

Figure 2B:
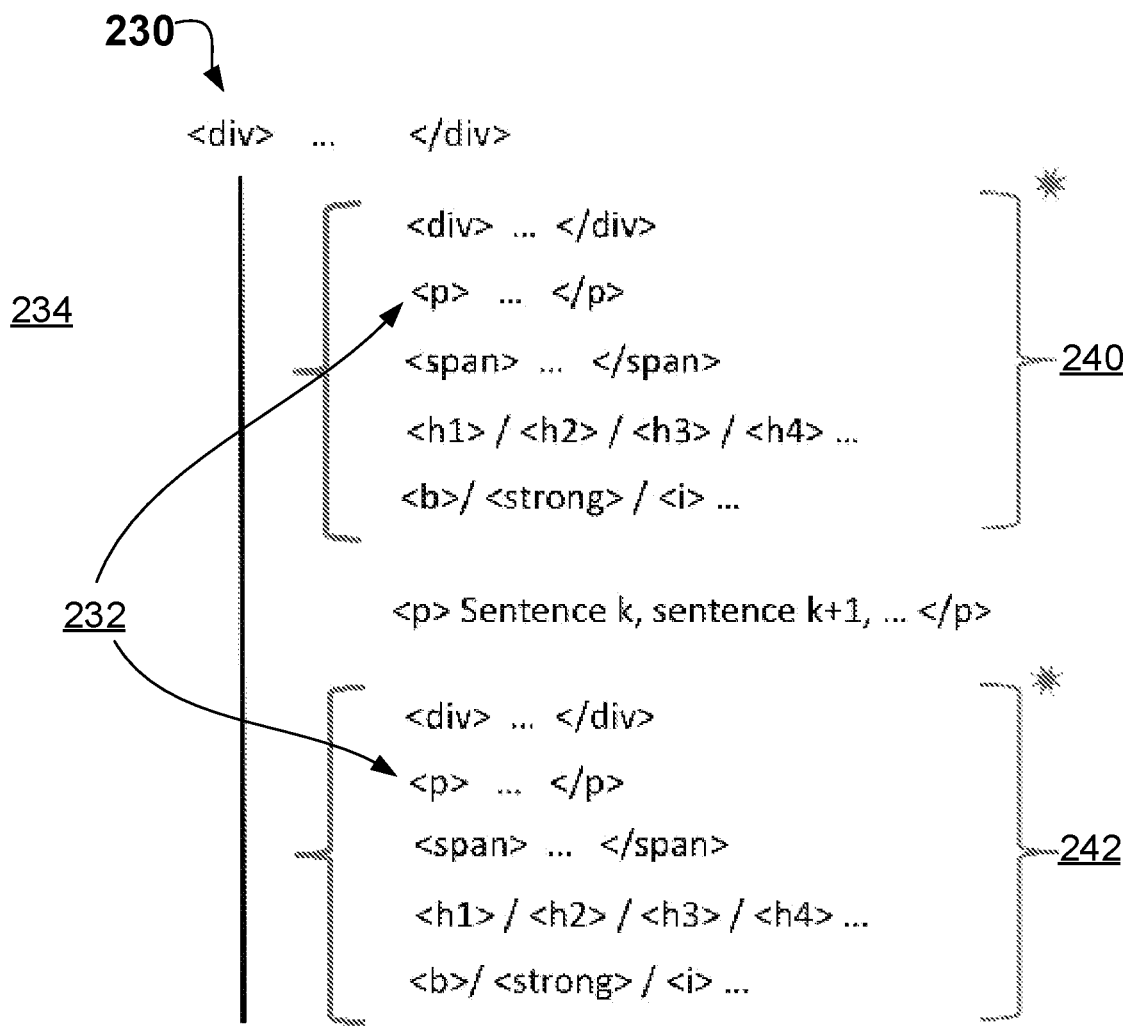
FIG. 2B is a block diagram illustrating a second example of extracted webpage data that may include hypertext markup language (HTML) code with DOM tag elements according to one embodiment.

Referring now to FIG. 2B, a block diagram 230 illustrating a second example of extracted webpage data that may include hypertext markup language (HTML) code with DOM tag elements 232, 234 according to one embodiment is depicted. Specifically, and as previously described, the context-aware knowledge base program 108A, 108B (FIG. 1) may extract webpage data using syntax-based content-aware extraction by first extracting DOM tag elements 232 associated with the webpage. For example, a webpage may include a business webpage. The context-aware knowledge base program 108A, 108B (FIG. 1) may extract the DOM tag elements 232, 234 associated with the insurance business webpage, such as extracting the DOM tag elements <div> and <p>. Furthermore, the context-aware knowledge base program 108A, 108B (FIG. 1) may detect a relationship between sections of the DOM tag elements. Specifically, according to one embodiment, a DOM tag element section 240 may be a sibling DOM tag element section to the DOM tag element section 242. Thereafter, the context-aware knowledge base program 108A, 108B (FIG. 1) may extract webpage data associated with the extracted DOM tags 232, 234 and/or the DOM tag element sections 240, 242.

Figure 3:
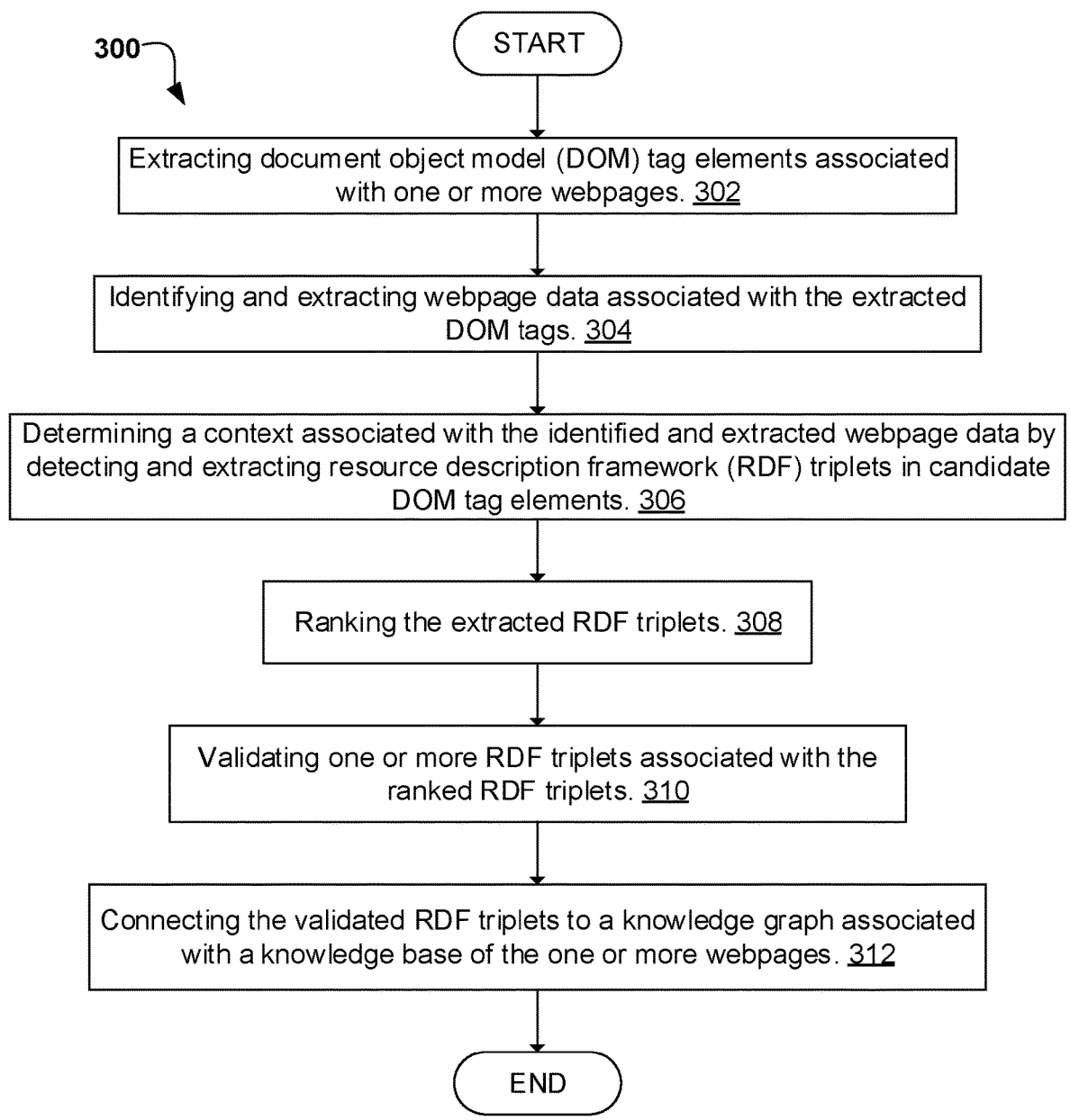
FIG. 3 is an operational flowchart illustrating the steps carried out by a program for generating a context-aware knowledge base according to one embodiment.

Referring now to FIG. 3, an operational flowchart 300 illustrating the steps carried out by a program for creating an automated context-aware knowledge base is depicted. Specifically, at a first stage, the context-aware knowledge base program 108A, 108B (FIG. 1) may generate a context-aware knowledge base by using syntax-based context-aware extraction of webpage data. More specifically, the context-aware knowledge base program 108A, 108B (FIG. 1) may use syntax-based context-aware extraction of webpage data beginning at 302, whereby the context-aware knowledge base program 108A, 108B (FIG. 1) may extract DOM tag elements associated with one or more webpages. For example, and as previously described in FIG. 2A, the one or more webpages may be associated with a business. The context-aware knowledge base program 108A, 108B (FIG. 1) may extract the DOM tag elements 202 associated with the business webpages, such as extracting the DOM tag elements: <span>, <div>, <span>, <ul>, and <li>. Furthermore, the context-aware knowledge base program 108A, 108B (FIG. 1) may detect relationships between the DOM tag elements. For example, the context-aware knowledge base program 108A, 108B (FIG. 1) may detect that the DOM tag element <ul> has a parent relationship to the DOM tag element <li>, that the DOM tag element <div> has a parent relationship to the DOM tag elements <ul> and <span> (located below <div>), and that the DOM tag elements <span> and <ul> are sibling DOM tag elements.

Next, at 304, the context-aware knowledge base program 108A, 108B (FIG. 1) may identify and extract webpage data associated with the extracted DOM tags. Specifically, the context-aware knowledge base program 108A, 108B (FIG. 1) may extract the webpage data associated with the extracted DOM tag elements by extracting text (such as sentences, phrases, and words) associated with the extracted DOM tag elements. For example, and as previously described at step 302, the one or more webpages may include webpages associated with business such as an insurance business. The context-aware knowledge base program 108A, 108B (FIG. 1) may extract the DOM tag elements 202 associated with a webpage from the insurance business webpages, such as by extracting each of the <li> DOM tag elements 202. Thereafter, the context-aware knowledge base program 108A, 108B (FIG. 1) may identify the text associated with each of the <li> DOM tag elements 202. For example, each of the extracted <li> DOM tag elements may correspond to a list item associated with, or included in, an unordered list (<un>) DOM tag element. Thereafter, the context-aware knowledge base program 108A, 108B (FIG. 1) may extract the text associated with each listed item within the <li> DOM tag elements.

Then, at 306, the context-aware knowledge base program 108A, 108B (FIG. 1) may determine a context associated with the identified webpage data. Specifically, the context may include parts of webpage data or text associated with extracted DOM tags that precedes and follows the identified webpage data to clarify the meaning of the identified webpage data. According to one embodiment, the context-aware knowledge base program 108A, 108B (FIG. 1) may determine a context associated with the identified and extracted webpage data by detecting and extracting resource description framework (RDF) triplets in candidate DOM tag elements, whereby the candidate DOM tag elements include the parent and/or sibling DOM tag elements that may include text and that are associated with, or are nearest, the extracted DOM tag elements. Specifically, and as previously described in FIGS. 2A and 2B as well as at step 304, the context-aware knowledge base program 108A, 108B (FIG. 1) may extract the webpage data associated with the extracted DOM tag elements 202 by extracting text associated with the extracted DOM tag elements 202. However, the context of the extracted text associated with the extracted DOM tag elements 202 may not be determined from the extracted text alone. For example, the context-aware knowledge base program 108A, 108B (FIG. 1) may extract text associated with list items from the <li> DOM tag elements 202, whereby in FIG. 2A list item a may include text such as "accident forgiveness," list item b may include text such "safe driving bonus," list item k may include text such as "deductible rewards," and list item n may include text such as "new car replacement program." However, the context associated with the text in the list items may be undetermined from the text alone, and the list items may be viewed as random text.

As such, the context-aware knowledge base program 108A, 108B (FIG. 1) may determine a context associated with the identified webpage data by detecting and extracting RDF triplets in candidate DOM tag elements, whereby the candidate DOM tag elements may include the parent and/or sibling DOM tag elements that include text and that are associated with the extracted DOM tag elements. Specifically, the context-aware knowledge base program 108A, 108B (FIG. 1) may search for RDF triplets in parent and sibling DOM tag elements, whereby the RDF triplets provides an indication for the context-aware knowledge base program 108A, 108B (FIG. 1) that text is within the parent and sibling DOM tag elements. More specifically, an RDF triple may be organized as: subject/predicate/object—where the predicate may be known as the relation which binds the subject and object. According to one embodiment, the context-aware knowledge base program 108A, 108B (FIG. 1) may extract the subject, predicate, and the object from the RDF triplets.

For example, and as previously described, the context-aware knowledge base program 108A, 108B (FIG. 1) may extract text associated with list items from the <li> DOM tag elements 202. However, and as previously described, the list items may be random list items based on not having context. As such, the context-aware knowledge base program 108A, 108B (FIG. 1) may search for RDF triplets in parent and sibling DOM tag elements to detect text in the parent and sibling DOM tag elements in order to provide context to the list items. For example, in FIG. 2A, the context-aware knowledge base program 108A, 108B (FIG. 1) may search for and extract RDF triplets in the parent DOM tag element <span> (located below <div>), whereby the RDF triplet may include the triplet: "benefits," which may represent the subject; "having list," which may represent the predicate; and whereby the unordered list (<ul>) that includes the listed items (<li>) may be the object. Also, according to one embodiment, the context-aware knowledge base program 108A, 108B (FIG. 1) may detect and extract RDF triplets in candidate DOM tag elements based on an order whereby the context-aware knowledge base program 108A, 108B (FIG. 1) may stop searching for RDF triplets in parent and sibling DOM tag elements upon finding at least one RDF triplet in a parent or sibling DOM tag element. More specifically, for example, if the context-aware knowledge base program 108A, 108B (FIG. 1) does not detect text, via detecting RDF triplets, in one or more sibling DOM tag elements to the extracted DOM tag element, the context-aware knowledge base program 108A, 108B (FIG. 1) may check one or parent DOM tag elements. However, if the context-aware knowledge base program 108A, 108B (FIG. 1) does detect text, via detecting RDF triplets, in one or more sibling DOM tag elements to the extracted DOM tag element, the context-aware knowledge base program 108A, 108B (FIG. 1) may not check the one or more parent DOM tag elements.

Next, at a second stage, the context-aware knowledge base program 108A, 108B (FIG. 1) may create an automated context-aware knowledge base by using semantic-based refinement. Specifically, and beginning at 308, the context-aware knowledge base program 108A, 108B (FIG. 1) may use semantic-based refinement by ranking the extracted RDF triplets. As previously described at steps 304 and 306, the context-aware knowledge base program 108A, 108B (FIG. 1) may determine a context associated with the identified and extracted webpage data by detecting and extracting RDF triplets in candidate DOM tag elements, whereby the candidate DOM tag elements include the parent and/or sibling DOM tag elements that may include text and that are associated with, or are nearest, the extracted DOM tag elements. Thereafter, the context-aware knowledge base program 108A, 108B (FIG. 1) may rank the extracted RDF triplets by determining a confidence score for the extracted RDF triplets, whereby the confidence score represents a level of connection between the extracted subject and the extracted object associated with the extracted RDF triplets, and whereby the confidence score may be based on the webpage data, or text, associated with the extracted DOM tag elements and the DOM tag element that includes the extracted RDF triplet. Also, according to one embodiment, the confidence score may be represented by a percentage. For example, based on the text associated with the extracted DOM tag elements and the DOM tag element that includes the extracted RDF triplet, the context-aware knowledge base program 108A, 108B (FIG. 1) may rank the extracted RDF triplet that includes "benefits" (subject), "having list" (predicate), and the unordered list (<ul>) that includes the listed items (object) as 90%.

Then, at 310, the context-aware knowledge base program 108A, 108B (FIG. 1) may validate one or more of the ranked RDF triplets. Specifically, according to one embodiment, the context-aware knowledge base program 108A, 108B (FIG. 1) may validate one or more of the ranked RDF triplets by generating and setting one or more threshold confidence scores, so that the extracted RDF triples having a confidence score that is above or below the one or more threshold confidence scores may or may not be discarded, may or may not be automatically validated, and/or may or may not be presented to a user for further review. Also, according to one embodiment, the one or more threshold confidence scores may be represented by a percentage.

For example, the context-aware knowledge base program 108A, 108B (FIG. 1) may set a threshold score of 50%, whereby the extracted RDF triplets having a confidence score below 50% are discarded. Furthermore, the context-aware knowledge base program 108A, 108B (FIG. 1) may set a threshold score of 80%, whereby the extracted RDF triplets having a confidence score above 80% are automatically approved by the context-aware knowledge base program 108A, 108B (FIG. 1). Furthermore, the context-aware knowledge base program 108A, 108B (FIG. 1) may set a threshold score of 50%-80%, whereby the extracted RDF triplets having a confidence score between 50% and 80% are sent to a user for further review.

Based on the ranking, the context-aware knowledge base program 108A, 108B (FIG. 1) may send one or more of the extracted RDF triplets to a user and enable the user to validate one or more of the ranked RDF triplets. Specifically, the context-aware knowledge base program 108A, 108B (FIG. 1) may send one or more of the extracted RDF triplets to a user based on the ranking and enable the user to edit the extracted RDF triplets and/or approve/validate one or more of the ranked RDF triplets. For example, and as previously described, the context-aware knowledge base program 108A, 108B (FIG. 1) may set a threshold score of 50%-80%, whereby the extracted RDF triplets having a confidence score between 50% and 80% are sent to a user for further review. Thereafter, the context-aware knowledge base program 108A, 108B (FIG. 1) may present a user with a user interface that includes the extracted subject, predicate, and object associated with the extracted RDF triplets for review and having a confidence score between 50% and 80%, as well as potential entities and assigned entities to the extracted RDF triplets. Furthermore, the context-aware knowledge base program 108A, 108B (FIG. 1) may enable a user to edit the extracted RDF triplets by enabling a user to perform the following actions: discard one or more of the RDF triplets, edit the subject of one or more of the RDF triplets, editing the predicate (i.e. relation between the subject and object) of the RDF triplets, edit the object of one or more of the RDF triplets, and edit an entity associated with the one or more of the RDF triplets. Then, the context-aware knowledge base program 108A, 108B (FIG. 1) may enable a user to validate one or more of the extracted RDF triples by clicking a "validate" or "approve" button on the user interface. Furthermore, according to one embodiment, the context-aware knowledge base program 108A, 108B (FIG. 1) may be trained/optimized to automatically, validate, edit, and/or discard RDF triplets that are similar to the RDF triplets that are validated, edited, and/or discarded by the user, whereby the similarity may be based on webpage data. Additionally, the context-aware knowledge base program 108A, 108B (FIG. 1) may present a user, via the user interface, with the list of RDF triplets for review and a list of approved RDF triplets in the user interface.

Next, at 312, the context-aware knowledge base program 108A, 108B (FIG. 1) may connect the validated RDF triplets to a knowledge graph associated with a knowledge base of the one or more webpages. Specifically, for example, the one or more webpages associated with a business may be organized based on a uniform resource locator (URL) hierarchy, whereby the webpage data associated with the one or more webpages may be distributed logically across the URL hierarchy. The URL hierarchy may be the web-schema which serves as an ontology for the knowledge graph, whereby the RDF triplets may be connected to web-schema nodes. As such, the context-aware knowledge base program 108A, 108B (FIG. 1) may connect the validated RDF triplets to a knowledge graph by connecting the RDF triplets to their associated web-schema nodes, whereby the web-schema nodes represent the webpage from which the validated RDF triplet was extracted.

It may be appreciated that FIGS. 2A, 2B, and 3 provide only illustrations of one implementation and does not imply any limitations with regard to how different embodiments may be implemented. Many modifications to the depicted environments may be made based on design and implementation requirements. For example, the context-aware knowledge base program 108A, 108B (FIG. 1) may determine entities for the validated RDF triplets. Specifically, the extracted RDF triples may or may not have entities associated with the extracted RDF triplet. As such, the context-aware knowledge base program 108A, 108B (FIG. 1) may determine entities to an extracted RDF triplet, or according to one embodiment, may enable a user to use the user interface to select an entity from a drop-down list (extracted from the one or more webpages using Alchemy API) or provide an entity by typing in an entity using a keyboard. More specifically, using topic modeling, the context-aware knowledge base program 108A, 108B (FIG. 1) may assign certain topics as entities and determine an entity for the extracted RDF triplet. For example, for the RDF triplet that may include "benefits" (subject), "having list" (predicate), and the unordered list (<ul>) that includes the listed items (object), the context-aware knowledge base program 108A, 108B (FIG. 1) may determine that the entity "insurance benefits" be attached to the RDF triplet.

Also, according to one embodiment, the context-aware knowledge base program 108A, 108B (FIG. 1) may track changes made to the validated RDF triplets. Specifically, the context-aware knowledge base program 108A, 108B (FIG. 1) may track changes in text for subject (original subject->new subject text), in a relation chosen for a validated RDF triplet, in changes in text for object (original object->new object text), and in entities chosen for a validated RDF triplet. Furthermore, according to one embodiment, the tracked changes may serve as training/optimization data for the context-aware knowledge base program 108A, 108B (FIG. 1).

Figure 4:
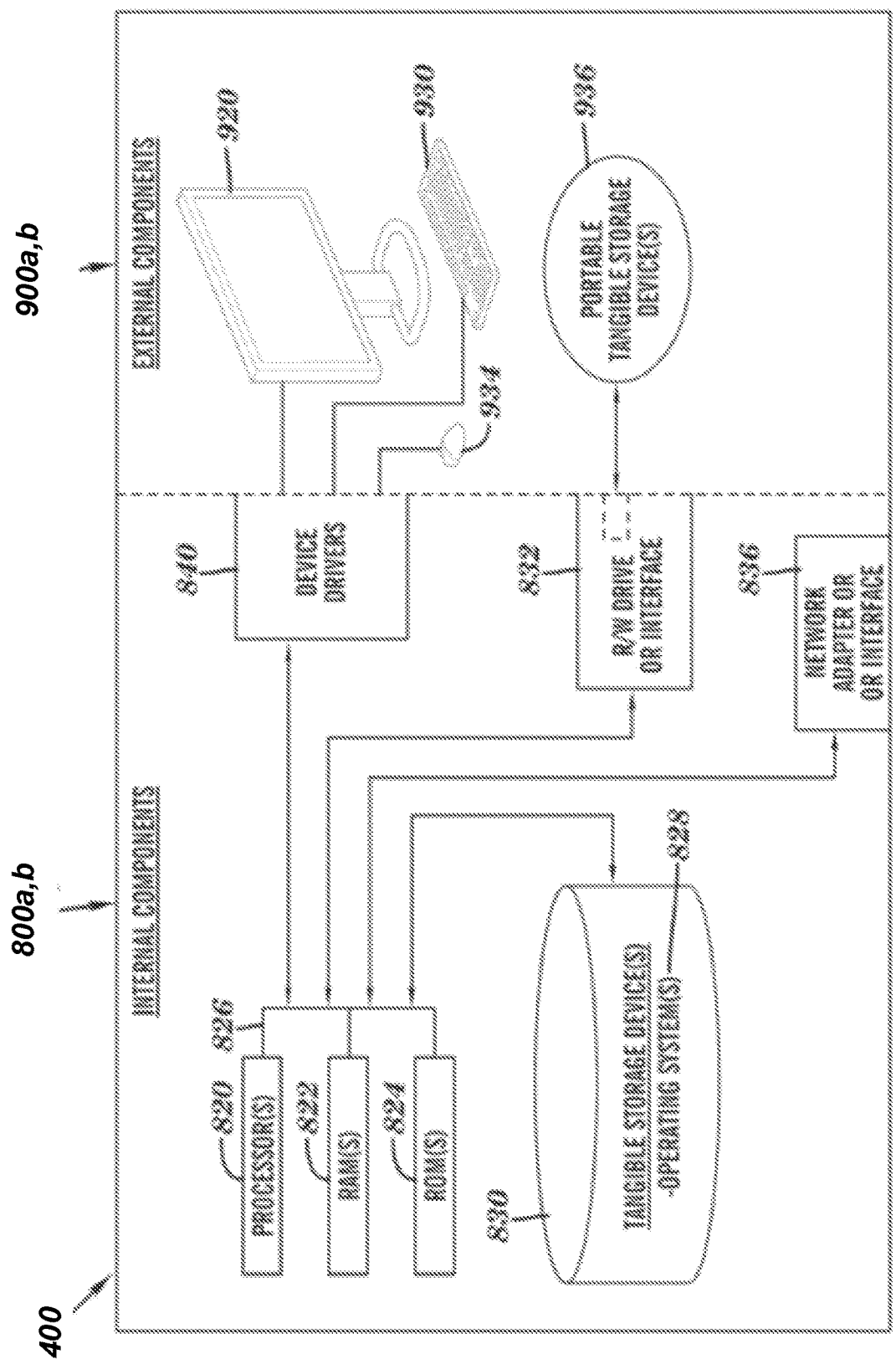
FIG. 4 is a block diagram of the system architecture of a program for generating a context-aware knowledge base according to one embodiment.

FIG. 4 is a block diagram 400 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1), and network server 112 (FIG. 1) include respective sets of internal components 800 a, b and external components 900 a, b illustrated in FIG. 4. Each of the sets of internal components 800 a, b includes one or more processors 820, one or more computer-readable RAMs 822, and one or more computer-readable ROMs 824 on one or more buses 826, and one or more operating systems 828 and one or more computer-readable tangible storage devices 830. The one or more operating systems 828, the software program 114 (FIG. 1) and the context-aware knowledge base program 108A (FIG. 1) in client computer 102 (FIG. 1), and the context-aware knowledge base program 108B (FIG. 1) in network server computer 112 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as a context-aware knowledge base program 108A and 108B (FIG. 1), can be stored on one or more of the respective portable computer-readable tangible storage devices 936, read via the respective R/W drive or interface 832, and loaded into the respective hard drive 830.

Each set of internal components 800 a, b also includes network adapters or interfaces 836 such as a TCP/IP adapter cards, wireless Wi-Fi interface cards, or 3G or 4G wireless interface cards or other wired or wireless communication links. The context-aware knowledge base program 108A (FIG. 1) and software program 114 (FIG. 1) in client computer 102 (FIG. 1), and the context-aware knowledge base program 108B (FIG. 1) in network server 112 (FIG. 1) can be downloaded to client computer 102 (FIG. 1) from an external computer via a network (for example, the Internet, a local area network or other, wide area network) and respective network adapters or interfaces 836. From the network adapters or interfaces 836, the context-aware knowledge base program 108A (FIG. 1) and software program 114 (FIG. 1) in client computer 102 (FIG. 1) and the context-aware knowledge base program 108B (FIG. 1) in network server computer 112 (FIG. 1) are loaded into the respective hard drive 830. The network may comprise copper wires, optical fibers, wireless transmission, routers, firewalls, switches, gateway computers, and/or edge servers.

Each of the sets of external components 900 a, b can include a computer display monitor 920, a keyboard 930, and a computer mouse 934. External components 900 a, b can also include touch screens, virtual keyboards, touch pads, pointing devices, and other human interface devices. Each of the sets of internal components 800 a, b also includes device drivers 840 to interface to computer display monitor 920, keyboard 930, and computer mouse 934. The device drivers 840, R/W drive or interface 832, and network adapter or interface 836 comprise hardware and software (stored in storage device 830 and/or ROM 824).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics Are As Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
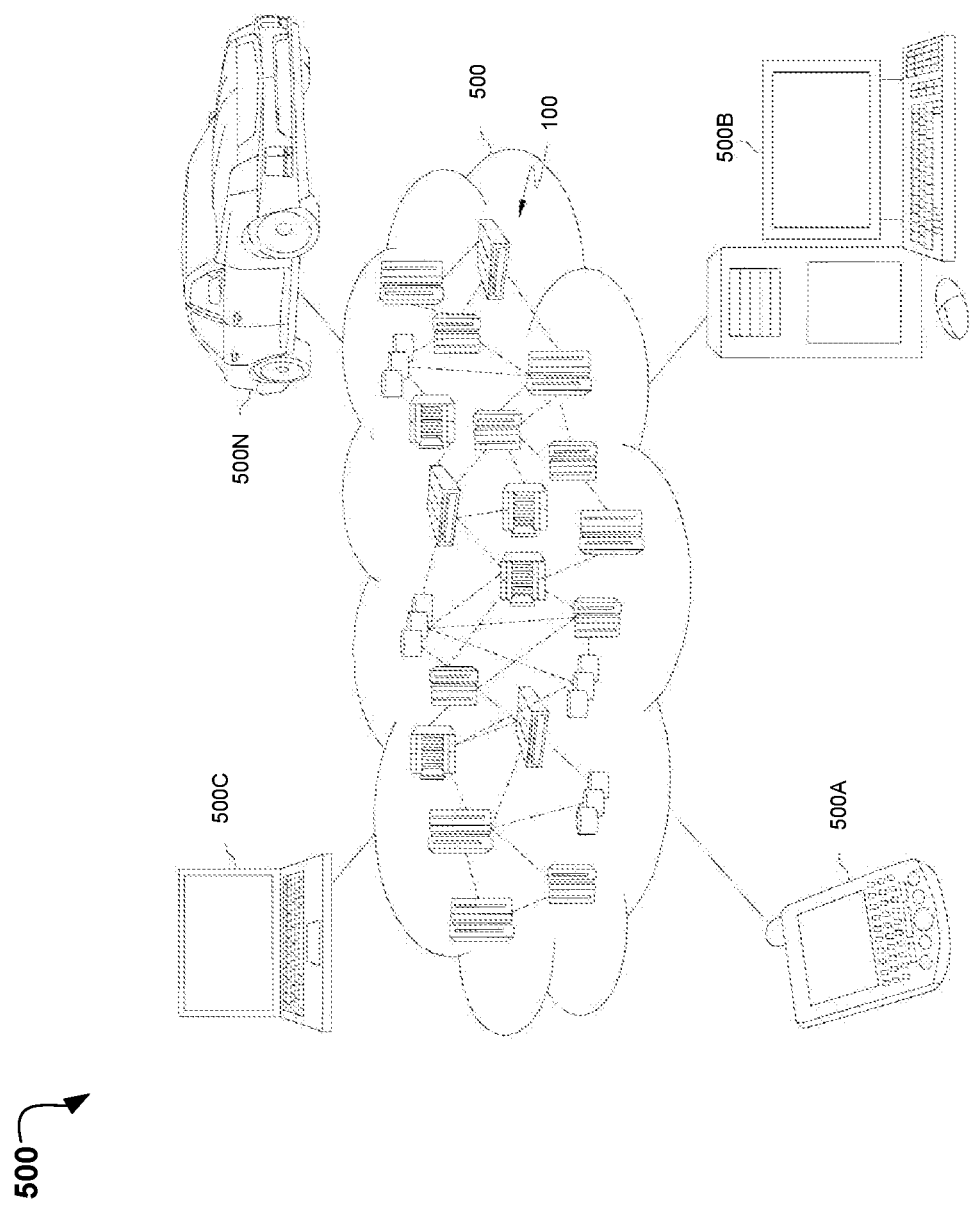
FIG. 5 is a block diagram of an illustrative cloud computing environment including the computer system depicted in FIG. 1, in accordance with an embodiment of the present disclosure.

Referring now to FIG. 5, illustrative cloud computing environment 500 is depicted. As shown, cloud computing environment 500 comprises one or more cloud computing nodes 100 with which local computing devices used by cloud consumers, such as, for example, personal digital assistant (PDA) or cellular telephone 500A, desktop computer 500B, laptop computer 500C, and/or automobile computer system 500N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 500A-N shown in FIG. 5 are intended to be illustrative only and that computing nodes 100 and cloud computing environment 500 can communicate with any type of computerized device over any type of network and/or network addressable connection (e.g., using a web browser).

Figure 6:
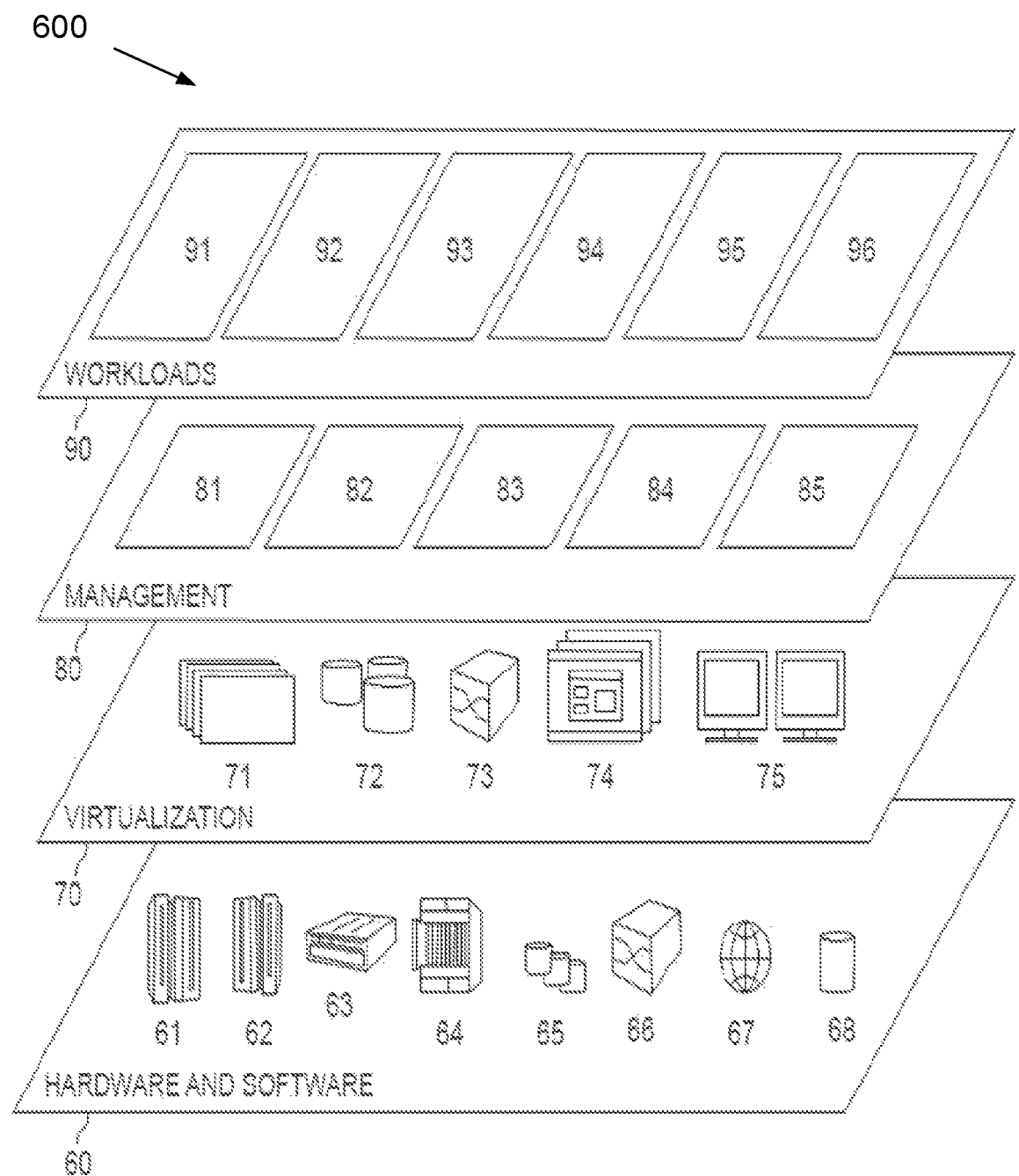
FIG. 6 is a block diagram of functional layers of the illustrative cloud computing environment of FIG. 5, in accordance with an embodiment of the present disclosure.

Referring now to FIG. 6, a set of functional abstraction layers 600 provided by cloud computing environment 500 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and context-aware knowledge base 96. A context-aware knowledge base program 108A, 108B (FIG. 1) may be offered "as a service in the cloud" (i.e., Software as a Service (SaaS)) for applications running on computing devices 102 (FIG. 1) and may provide a context-aware knowledge base system for presenting structured answers to a query.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for generating a context-aware knowledge base, the method comprising:
   extracting document object model (DOM) tag elements associated with a webpage;
   identifying and extracting webpage data associated with a first DOM tag element from the extracted DOM tags;
   determining a context associated with the identified and extracted webpage data for the first DOM tag element, wherein determining the context comprises,
      detecting and extracting resource description framework (RDF) triplets in candidate DOM tag elements, wherein the candidate DOM tag elements are based on a determined relationship to the first DOM tag element and include parent and sibling DOM tag elements, and wherein detecting and extracting the RDF triplets comprises detecting and extracting the RDF triplets from the candidate DOM tag elements nearest the first DOM tag element and based on an order associated with the determined relationship until text is identified, and
ranking the extracted RDF triplets based on a connection between the RDF triplets and the webpage data associated with the first DOM tag element;
validating one or more RDF triplets associated with the ranked RDF triplets; and
connecting the validated RDF triplets to a knowledge graph associated with a knowledge base of the webpage.

2. The method of claim 1, wherein extracting the DOM tag elements associated with the webpage further comprises:
determining a relationship between the extracted DOM tag elements.

3. The method of claim 1, wherein identifying and extracting the webpage data associated with the first DOM tag element from the extracted DOM tags further comprises:
extracting text associated with the first DOM tag element.

4. The method of claim 1, wherein ranking the extracted RDF triplets further comprises:
determining a confidence score for the extracted RDF triplets, wherein the confidence score represents a level of connection between an extracted subject and an extracted object associated with the extracted RDF triplets.

5. The method of claim 1, wherein validating the one or more RDF triplets associated with the ranked RDF triplets further comprises:
generating and setting one or more threshold confidence scores; and
enabling a user to edit and validate the one or more RDF triplets associated with the ranked RDF triplets.

6. The method of claim 1, further comprising:
tracking changes to the validated RDF triplets.

7. A computer system for generating a context-aware knowledge base, comprising:
one or more processors, one or more computer-readable memories, one or more computer-readable tangible storage devices, and program instructions stored on at least one of the one or more storage devices for execution by at least one of the one or more processors via at least one of the one or more memories, wherein the computer system is capable of performing a method comprising:
extracting document object model (DOM) tag elements associated with a webpage;
identifying and extracting webpage data associated with a first DOM tag element from the extracted DOM tags;
determining a context associated with the identified and extracted webpage data for the first DOM tag element, wherein determining the context comprises,
detecting and extracting resource description framework (RDF) triplets in candidate DOM tag elements, wherein the candidate DOM tag elements are based on a determined relationship to the first DOM tag element and include parent and sibling DOM tag elements, and wherein detecting and extracting the RDF triplets comprises detecting and extracting the RDF triplets from the candidate DOM tag elements nearest the first DOM tag element and based on an order associated with the determined relationship until text is identified, and
ranking the extracted RDF triplets based on a connection between the RDF triplets and the webpage data associated with the first DOM tag element;
validating one or more RDF triplets associated with the ranked RDF triplets; and
connecting the validated RDF triplets to a knowledge graph associated with a knowledge base of the webpage.

8. The computer system of claim 7, wherein extracting the DOM tag elements associated with the webpage further comprises:
determining a relationship between the extracted DOM tag elements.

9. The computer system of claim 7, wherein identifying and extracting the webpage data associated with the first DOM tag element from the extracted DOM tags further comprises:
extracting text associated with the first DOM tag element.

10. The computer system of claim 7, wherein ranking the extracted RDF triplets further comprises:
determining a confidence score for the extracted RDF triplets, wherein the confidence score represents a level of connection between an extracted subject and an extracted object associated with the extracted RDF triplets.

11. The computer system of claim 7, wherein validating the one or more RDF triplets associated with the ranked RDF triplets further comprises:
generating and setting one or more threshold confidence scores; and
enabling a user to edit and validate the one or more RDF triplets associated with the ranked RDF triplets.

12. The computer system of claim 7, further comprising:
tracking changes to the validated RDF triplets.

13. A computer program product for generating a context-aware knowledge base, comprising:
one or more computer-readable storage devices and program instructions stored on at least one of the one or more tangible storage devices, the program instructions executable by a processor, the program instructions comprising:
program instructions to extract document object model (DOM) tag elements associated with a webpage;
program instructions to identify and extract webpage data associated with a first DOM tag element from the extracted DOM tags;
program instructions to determine a context associated with the identified and extracted webpage data for the first DOM tag element, wherein determining the context comprises,
program instructions to detect and extract resource description framework (RDF) triplets in candidate DOM tag elements, wherein the candidate DOM tag elements are based on a determined relationship to the first DOM tag element and include parent and sibling DOM tag elements, and wherein detecting and extracting the RDF triplets comprises detecting and extracting the RDF triplets from the candidate DOM tag elements nearest the first DOM tag element and based on an order associated with the determined relationship until text is identified, and
program instructions to rank the extracted RDF triplets based on a connection between the RDF triplets and the webpage data associated with the first DOM tag element;
program instructions to validate one or more RDF triplets associated with the ranked RDF triplets; and
program instructions to connect the validated RDF triplets to a knowledge graph associated with a knowledge base of the webpage.

14. The computer program product of claim 13, wherein the program instructions to extract the DOM tag elements associated with the webpage further comprises:
   program instructions to determine a relationship between the extracted DOM tag elements.

15. The computer program product of claim 13, wherein the program instructions to rank the extracted RDF triplets further comprises:
   program instructions to determine a confidence score for the extracted RDF triplets, wherein the confidence score represents a level of connection between an extracted subject and an extracted object associated with the extracted RDF triplets.

16. The computer program product of claim 13, wherein the program instructions to validate the one or more RDF triplets associated with the ranked RDF triplets further comprises:
   program instructions to generate and set one or more threshold confidence scores; and
   program instructions to enable a user to edit and validate the one or more RDF triplets associated with the ranked RDF triplets.

17. The computer program product of claim 13, further comprising:
   program instructions to track changes to the validated RDF triplets.

* * * * *